(12) United States Patent
Kato

(10) Patent No.: US 6,615,966 B2
(45) Date of Patent: Sep. 9, 2003

(54) LUBRICATION CONTROL APPARATUS FOR START CLUTCH OF AUTOMATIC TRANSMISSION

(75) Inventor: Yoshiaki Kato, Kanagawa (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 09/953,936

(22) Filed: Sep. 18, 2001

(65) Prior Publication Data

US 2002/0033314 A1 Mar. 21, 2002

(30) Foreign Application Priority Data

Sep. 21, 2000 (JP) ........................................ 2000-287183

(51) Int. Cl.⁷ ............................................. F16D 13/72
(52) U.S. Cl. ................................ 192/70.12; 192/113.35
(58) Field of Search ......................... 192/70.12, 113.34, 192/113.35

(56) References Cited

U.S. PATENT DOCUMENTS

| | | | | | |
|---|---|---|---|---|---|
| 4,458,318 A | * | 7/1984 | Smit et al. | .................... | 701/51 |
| 4,753,332 A | * | 6/1988 | Bieber et al. | ............ | 192/70.12 |
| 5,224,578 A | * | 7/1993 | Rheinheimer et al. | ... | 192/113.1 |
| 5,314,385 A | * | 5/1994 | Haley et al. | .................. | 474/28 |
| 6,042,498 A | * | 3/2000 | Kashiwase | .................. | 475/210 |

FOREIGN PATENT DOCUMENTS

| | | | | |
|---|---|---|---|---|
| JP | 1-188723 A | * | 7/1989 | ............ 192/113.35 |
| JP | 5-149418 | | 6/1993 | |
| JP | 10-331869 | | 12/1998 | |

OTHER PUBLICATIONS

U.S. patent application Ser. No. 09/936,811, Murasugi et al., filed Sep. 18, 2001.
U.S. patent application Ser. No. 09/953,893, Tanaka et al., filed Sep. 18, 2001.
U.S. patent application Ser. No. 09/953,895, Saito, filed Sep. 18, 2001.
U.S. patent application Ser. No. 09/953,937, Saito et al., filed Sep. 18, 2001.
U.S. patent application Ser. No. 09/953,966, Saito et al., filed Sep. 18, 2001.
U.S. patent application Ser. No. 09/953,967, Saito et al., filed Sep. 18, 2001.
U.S. patent application Ser. No. 09/953,968, Saito et al., filed Sep. 18, 2001.
U.S. patent application Ser. No. 09/953,969, Saito et al., filed Sep. 18, 2001.
U.S. patent application Ser. No. 09/953,972, Saito et al., filed Sep. 18, 2001
U.S. patent application Ser. No. 09/954,017, Murasugi et al., filed Sep. 18, 2001.
U.S. patent application Ser. No. 09/954,019, Saito et al., filed Sep. 18, 2001.
U.S. patent application Ser. No. 09/954,298, Saito et al., filed Sep. 18, 2001.

* cited by examiner

Primary Examiner—Richard M. Lorence
(74) Attorney, Agent, or Firm—Foley & Lardner

(57) ABSTRACT

A lubrication control apparatus for properly lubricating an electromagnetic start clutch of an automatic transmission is comprised of an oil supplying section that supplies lubricating oil to the start clutch, an oil returning section that returns the lubricating oil from the start clutch to the automatic transmission, and a quantity varying section varies a supply quantity of the lubricating oil supplied to the start clutch according to a slipping state of the start clutch.

15 Claims, 9 Drawing Sheets

LUBRICATION CONTROL APPARATUS FOR START CLUTCH OF AUTOMATIC TRANSMISSION

BACKGROUND OF THE INVENTION

The present invention relates to a lubrication control apparatus for a start clutch disposed between an automatic transmission and a power source.

Generally, an automatic transmission is connected to an engine through a torque converter. Such a torque converter enables a smooth power transmission although its slipping degrades a fuel consumption efficiency. In order to further improve a power transmitting efficiency, there is proposed a power transmission system employing an electromagnetic clutch or hydraulic clutch instead of a torque converter.

Each of Japanese Patent Provisional Publications Nos. 10-331869 and 5-149418 discloses such a power transmission system which employs a hydraulic clutch as a start clutch. In view of a structural simplicity and a performance of a system, an electromagnetic clutch is preferable to a hydraulic clutch.

SUMMARY OF THE INVENTION

However, even if an electromagnetic clutch is employed as a start clutch instead of a torque converter, it is necessary to lubricate the electromagnetic start clutch when the start clutch is put in a slipping state. Further, it is preferable to accurately execute the lubrication of the start clutch according to the slipping state of the start clutch and to adapt a torque-converter type automatic transmission to automatic transmission employing an electromagnetic type start clutch without largely changing the design of the automatic transmission for providing a start clutch lubrication apparatus.

It is therefore an object of the present invention to provide a start clutch lubrication apparatus of an automatic transmission which is arranged to solve the above-mentioned problems.

An aspect of the present invention resides in a lubrication control apparatus for a start clutch of an electromagnetic type. The start clutch is disposed between a power source and an automatic transmission to transmit the power of the power source to the automatic transmission. The start clutch lubrication apparatus comprises oil supplying means for supplying lubricating oil to the start clutch, oil returning means for returning the lubricating oil from the start clutch to the automatic transmission, and quantity varying means for varying a supply quantity of the lubricating oil supplied to the start clutch according to a slipping state of the start clutch.

Another aspect of the present invention resides in a lubrication control apparatus for an electromagnetic start clutch disposed between an engine and an automatic transmission. The lubrication control apparatus comprises a start clutch operating condition detector that obtains information indicative of an operating condition of the start clutch, an oil-quantity varying valve-unit that varies a supply quantity of lubricating oil supplied to the start clutch and a controller coupled to the start clutch operating condition detector and the lubricating oil quantity varying valve unit. The controller is arranged to determine the operation condition of the start clutch on the basis of the information obtained by the start clutch operating condition detector, to determine a supply quantity of the lubricating oil supplied to the start clutch according to the operating condition of the start clutch, and to output a control signal to the oil-quantity varying valve-unit to control the supply quantity to the start clutch at the determined supply quantity.

Further another aspect of the present invention resides in a method for controlling a lubricating oil quantity supplied to a start clutch of an electromagnetic type. The start clutch is disposed between an engine and an automatic transmission, the method comprises a step of obtaining information indicative of an operating condition of the start clutch, a step of determining an operation condition of the start clutch on the basis of the information indicative of the operating condition of the start clutch, a step of determining a supply quantity of the lubricating oil supplied to the start clutch according to the operating condition of the electromagnetic clutch, and a step of controlling the lubricating oil quantity supplied to the start clutch at the determined supply quantity.

DETAILED DESCRIPTION OF THE INVENTION

Referring to FIGS. 1 to 7D, there is shown a lubrication control apparatus for a start clutch of an automatic transmission according to a first embodiment of the present invention.

Figure 1:
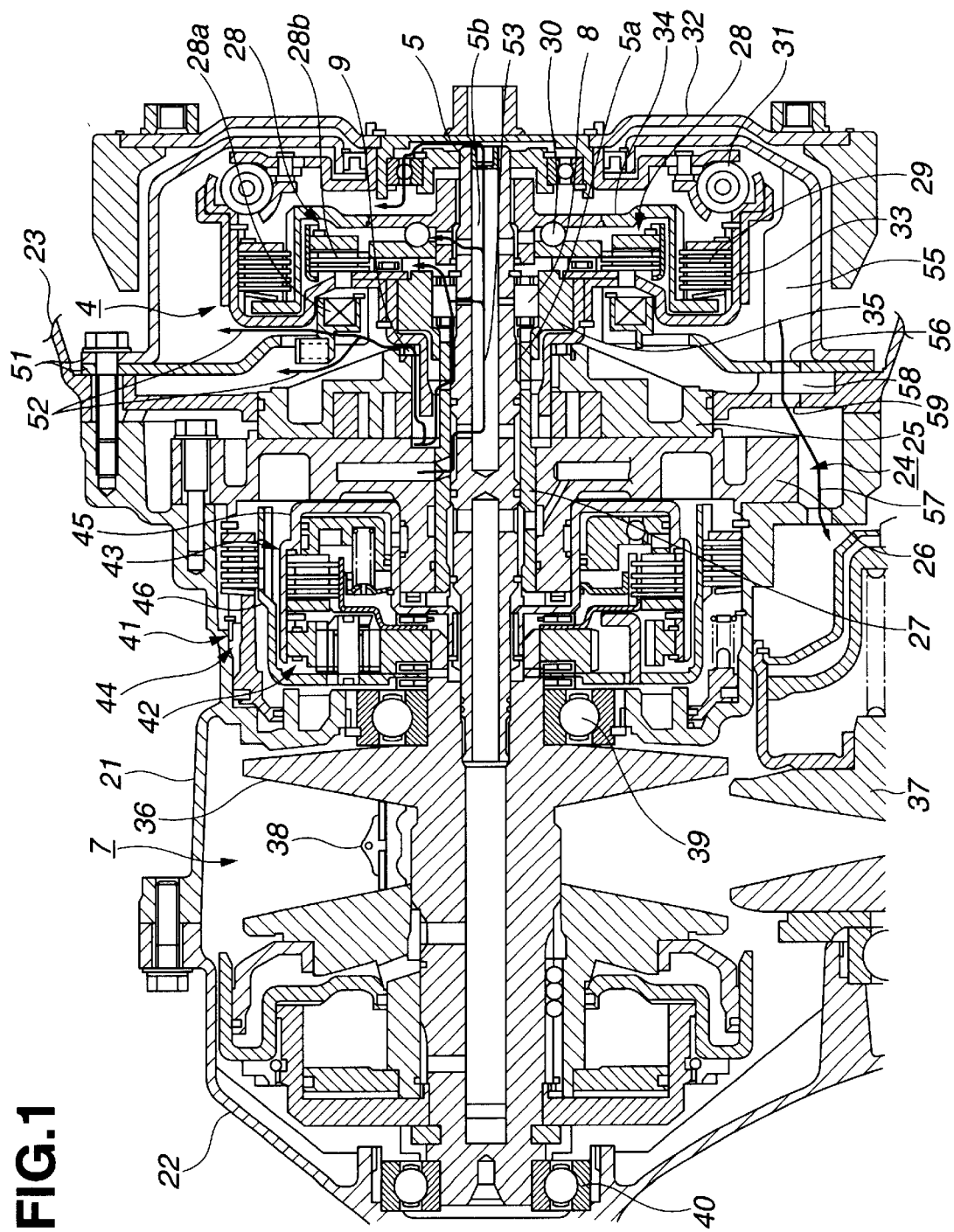
FIG. 1 is a cross sectional view showing an essential part of an automatic transmission provided with a start clutch lubrication control apparatus according to a first embodiment of the present invention.
Figure 2:
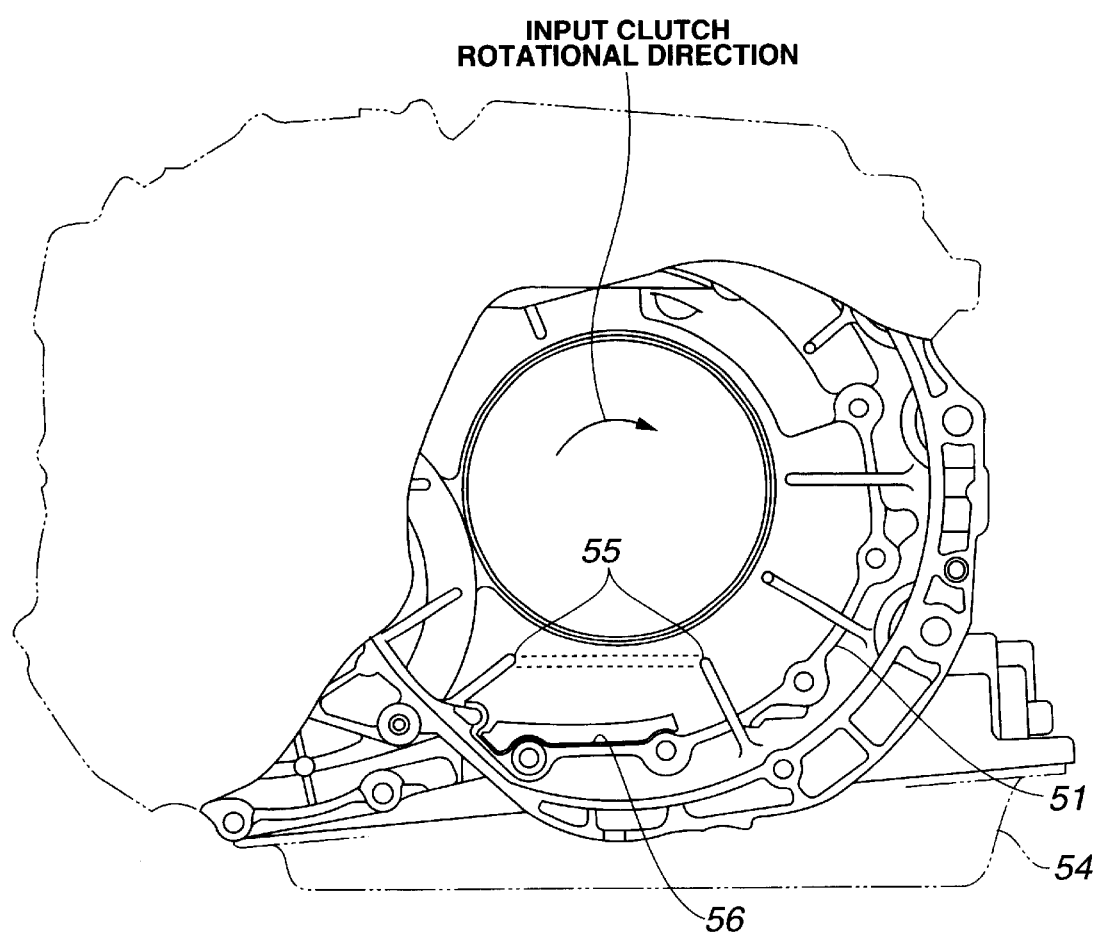
FIG. 2 is a front view partially showing an inner portion of a start clutch case of FIG. 1.
Figure 3:
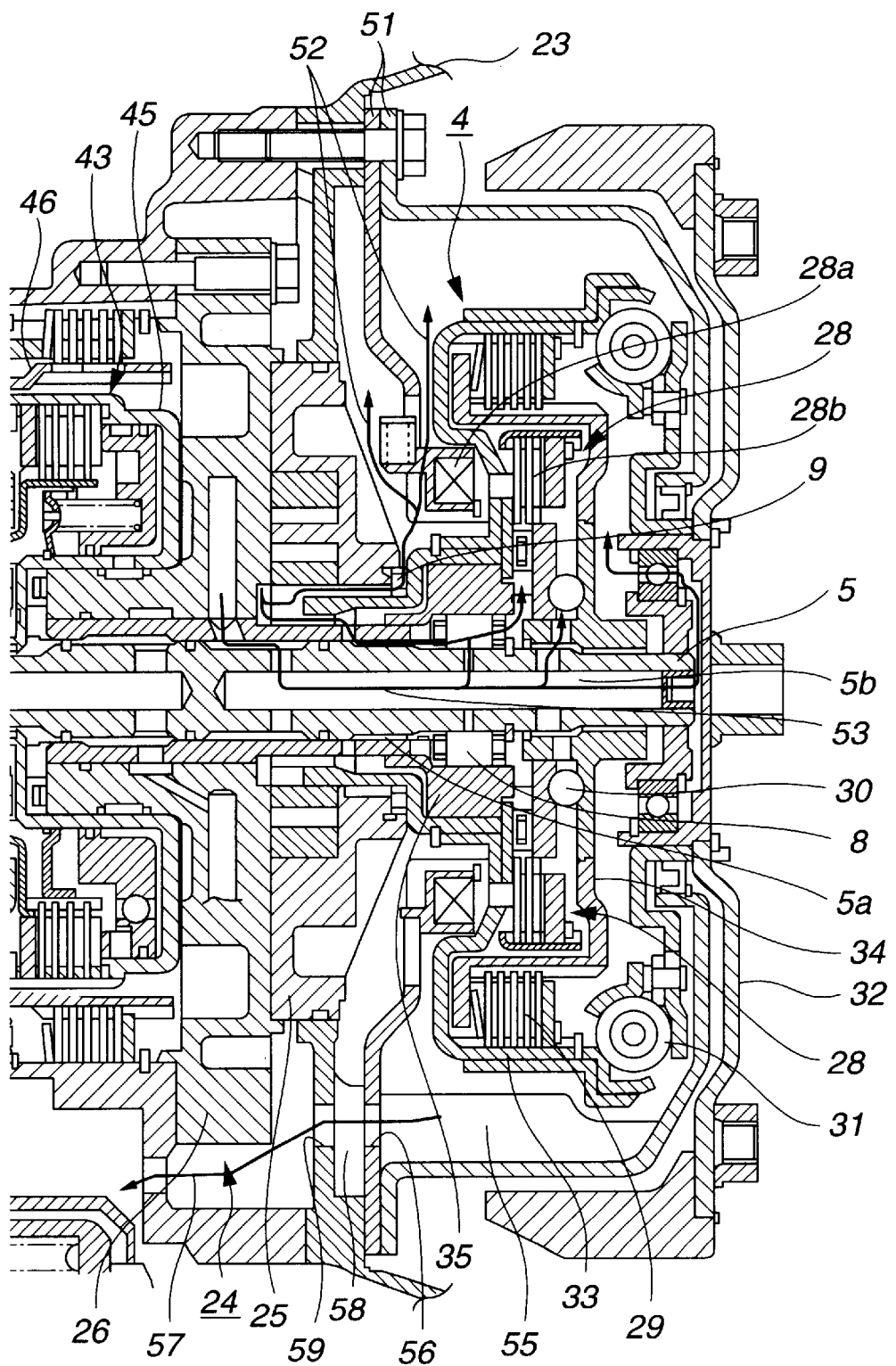
FIG. 3 is an enlarged cross sectional view of the automatic transmission of FIG. 1.
Figure 4:
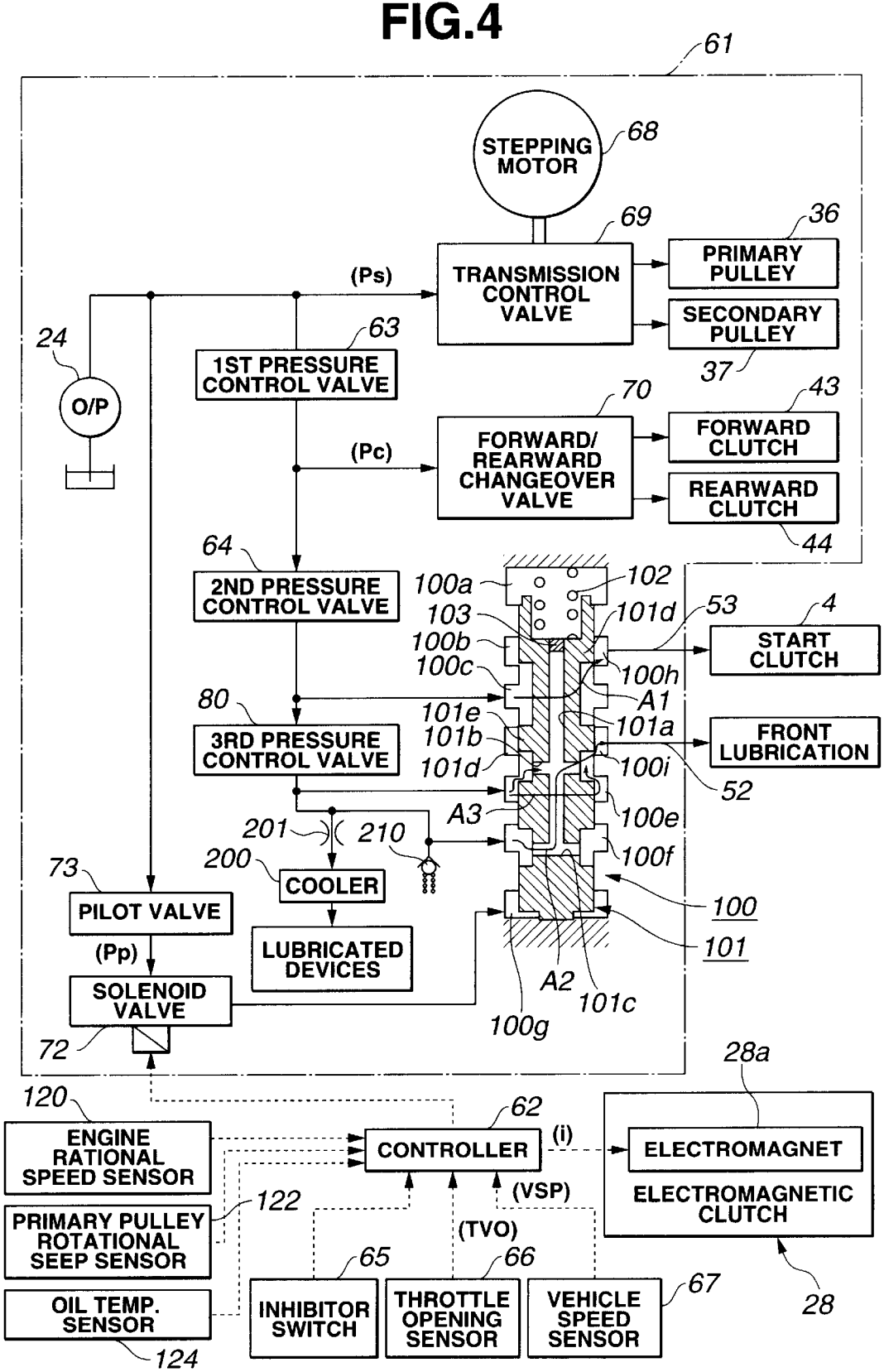
FIG. 4 is a schematic block diagram showing a shift control section of the automatic transmission wherein a lubrication control valve set in a minimum flow quantity state is disclosed.
Figure 5:
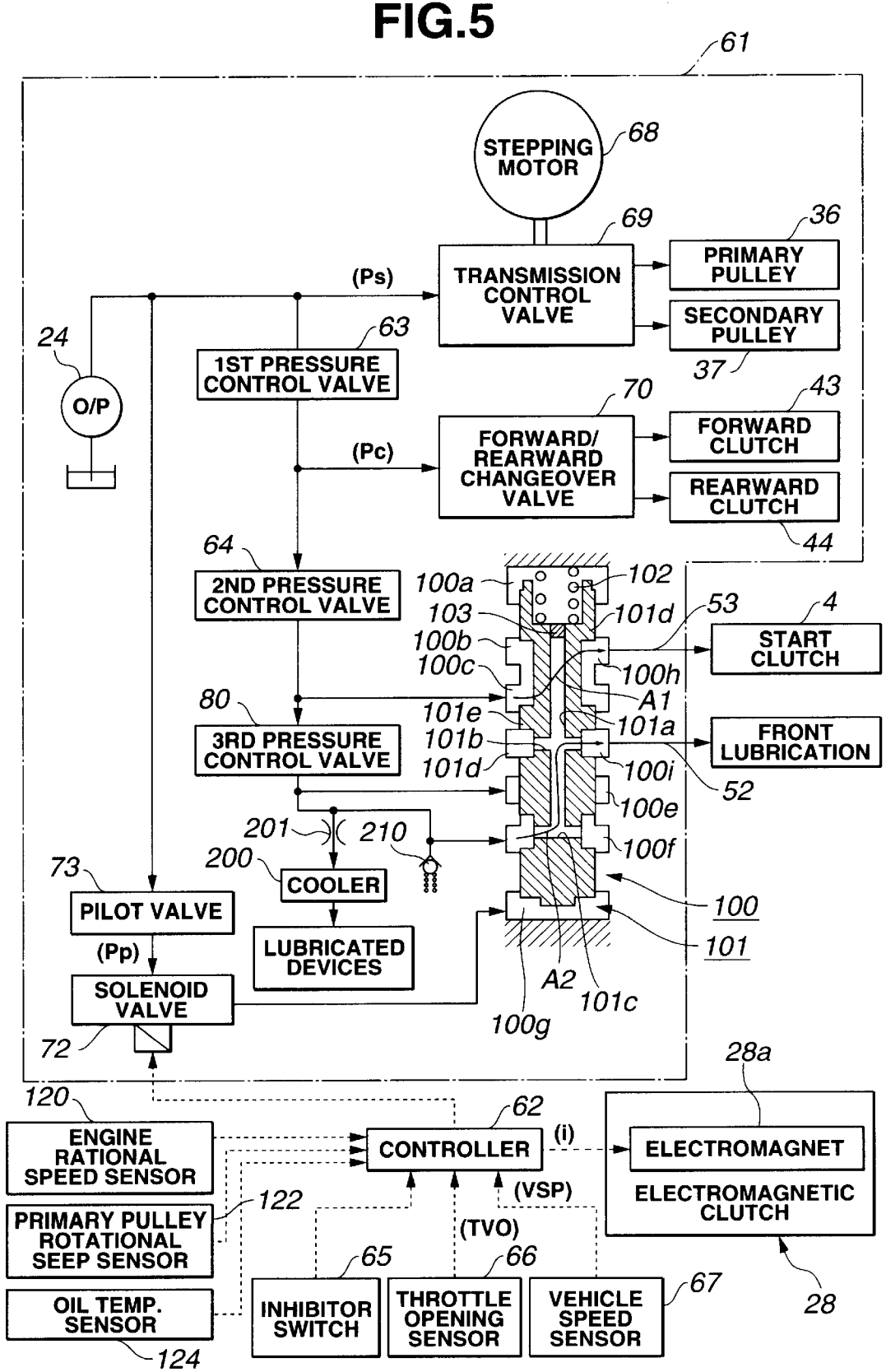
FIG. 5 is a schematic block diagram showing a shift control section of the automatic transmission wherein the lubrication control valve set in a maximum flow quantity state is disclosed.

FIGS. 1 and 2 shows the automatic transmission including the lubrication control apparatus for the start clutch 4. FIG. 3 shows a cross sectional view of the automatic transmission, FIGS. 4 and 5 show a control system of the automatic transmission.

In this first embodiment, the automatic transmission is a V-belt type continuously variable transmission (V-belt type CVT) which has a shifting section 7 as shown in FIG. 1. The detailed explanation of the shifting section 7 will be discussed later.

As shown in FIGS. 1 and 2, a rear end portion of a transmission case 21 of the automatic transmission is fixed connected to an end cover 22 for closing an opening at a rear end of the automatic transmission by means of bolts, and a front end portion of the transmission case 21 is fixedly connected to a start-clutch housing 23 by means of bolts.

An oil pump 24 is disposed between the transmission case 21 and the start-clutch housing 23. This oil pump is a normal internal gear pump, and elements of this internal gear pump 24 are disposed in a space defined by a pump housing 25 and a pump cover 26.

A hollow sleeve 27 is fixedly engaged with an inner periphery of the pump cover 26. An input shaft 5 is rotatably installed in the hollow sleeve 27. A start clutch 4 is disposed on a front end portion of the input shaft 5 projecting into the start-clutch housing 23. The start clutch 4 is constituted by an electromagnetic clutch 28 including an electromagnet 28a and an electromagnetic clutch pack 28a, a start-clutch pack 29 disposed around the electromagnetic clutch 28 and a loading cam 30 disposed inside of the electromagnetic clutch 28. A clutch drum 33 is connected to a crankshaft of an engine (not shown) through a torsion damper 31 and a drive plate 32. The clutch drum 33 also acts as a drive shaft of the oil pump 24. Therefore, when the electromagnetic clutch 28 is put in the engaged state, the rotation of a clutch drum 33 driven by the engine is transmitted to a loading cam 30.

When the rotational power of the engine is inputted to the loading cam 30 by the engagement of the electromagnetic clutch 38, the loading cam 30 applies a thrust force directing along the right hand direction of FIG. 1 to a clutch hub 34 due to its cam action where balls roll on an inclined surface. By this trust force, the clutch hub 34 splined to the input shaft 5 is moved in the right hand direction in FIG. 1. By the movement of the clutch hub 34, the start-clutch pack 29 is put in an engaged state, and therefore the start clutch 4 is put in the engaged state so that the clutch drum 34 driven by the engine is connected to the clutch hub 34 to transmit the rotational power of the engine to the input shaft 5.

A one-way clutch 8 is disposed between the oil pump 24 and the loading cam 30 and is engaged with the input shaft 5. An annular member 35 rotatbly connected on an outer surface of the one-way clutch 8 is fixed to a front end portion of the hollow sleeve 27 so that the annular member 35 and the hollow sleeve 27 receive a reaction force of the one-way clutch 8. That is, by this arrangement, the one-way clutch 8 prevents the input shaft 5 from rotating in the reverse direction of the engine rotation, and performs a hill hold function that a vehicle is stopped on a slope.

A primary pulley 34 is butted with a rear end of the input shaft 5 projecting into the transmission case 21 so as to be rotatable with respect to the input shaft 5. The shifting section 7 is constituted by the primary pulley 36, a secondary pulley 37 and a V-belt 38 wound to these pulleys 36 and 37. The primary pulley 36 and the secondary pulley 37 are arranged to reciprocally vary their V-shaped grooves in the reverse directions. This reciprocal change of the V-shaped grooves enables the wound diameters for the V-belt 38 to be continuously varied, and the continuous shift of the shifting section 7 is achieved thereby. An output rotational power at the secondary pulley 37 is transmitted to right and left wheels of the vehicle through a differential gear apparatus so that the vehicle can travel by the engine power.

A front end of the primary pulley 36 is supported by the transmission case 21 through a bearing 39, and a rear end of the primary pulley 36 is supported by the end cover 22 through a bearing 40. A forward and rearward changeover mechanism 41 is installed to an engaged portion between the input shaft 5 and the primary pulley 36. The forward and rearward changeover mechanism 41 is constituted by a simple planetary gear unit 42, a wet and multi-plate type forward clutch 43, and a rearward brake 44. The simple planetary gear set 42 is arranged to construct an input element by drivingly connecting a ring gear through a clutch drum 45 of the forward clutch 43 to the input shaft 5, an output element by drivingly connecting a sun gear with the primary pulley 36, and a suitable reaction receiving mechanism by connecting a carrier with a hub 46 of the rearward brake 44.

By engaging the forward clutch 43, the ring gear and the sun gear of the simple planetary gear set 42 are drivingly connected with each other and therefore all elements of the planetary gear set 42 is integrated. Accordingly, the rotation of the input shaft 5 is directly transmitted to the primary pulley 36 so that the vehicle can run forwardly. By engaging the rearward brake 44, the carrier of the simple planetary gear set 42 is fixed to perform as a reaction element. Therefore the rotation of the input shaft 5 is changed into a reverse rotation while being decelerated, and is transmitted to the primary pulley 36 so that the vehicle can run rearward.

The manner of operation of the automatic transmission of FIG. 1 will be discussed hereinafter.

When the automatic transmission is put in a neutral (N) range or a parking (P) range according to the driver's intent to keep stopping the vehicle, the electromagnet 28a of the electromagnetic clutch 28 is de-energized. By this turn-off state of the electromagnetic clutch 28, the start clutch 4 is put in a disengaged state. Further, the forward clutch 43 and the backward brake 43, which act as starting friction element, are also put in a disengaged state. Therefore, the engine rotation is not transmitted to the primary pulley 36, and the vehicle is put in a stopping condition.

When the forward drive (D) range is selected according to the driver's intent to run the vehicle forwardly, the forward clutch 43 is engaged by executing the hydraulic operation. Under this condition, when the electromagnetic clutch 28 is engaged by energizing the electromagnet 28a, the start clutch 4 is engaged by the cam action of the loading cam 30, and therefore the rotational power of the engine is transmitted to the input shaft 5. The power applied to the input shaft 5 directly reaches the primary pulley 36 through the engaged forward clutch 43 and the planetary gear set 42. This power is transmitted to the wheels through the shifting section 7 which executes the continuously variable shifting, and therefore the vehicle can run forward. When the vehicle is started, by gradually executing the energizing of the electromagnet 28a, the engaging speed of the electromagnetic clutch 28 is controlled so that the vehicle can smoothly start to run forwardly.

When the rearward drive (R) range is selected according to the driver's intent to run the vehicle rearward, the rearward clutch 44 is engaged by the hydraulic operation. Under this condition, when the electromagnetic clutch 28 is engaged by energizing the electromagnet 28a, the start clutch 4 is engaged by the cam action of the loading cam 30, and therefore the rotational power of the engine is transmitted to the input shaft 5. The power applied to the input shaft 5 is changed into a reverse rotation and decelerated. Then, the reverse rotational power reaches the primary pulley 36 through the engaged forward clutch 43 and the planetary gear set 42. This reverse rotational power is further transmitted to the wheels through the shifting section 7 which executes the continuously variable transmission, and therefore the vehicle can run rearward. When the vehicle is started, by gradually executing the energizing of the electromagnet 28a, the engaging speed of the electromagnetic clutch 28 is controlled so that the vehicle can smoothly start to run in the rearward direction.

Next, the lubrication control apparatus for the start clutch 4 according to the first embodiment of the present invention will be discussed.

The lubrication control apparatus of the start clutch 4 comprises a supplying means for supplying lubricating oil to the electromagnetic start clutch 4 and a returning means for returning the lubricating oil, which was rubricated and cooled the start clutch 4, into the automatic transmission.

As shown in FIG. 3, the supplying means includes passages 52 which were used as an inlet hydraulic passage for lockup operation of a torque converter, and passages 53 which were used as an outlet hydraulic passage for the lockup operation of the torque converter. The passages 52 are employed as front-portion lubricating passages 52 which lubricate the electromagnet 28a and a thrust bearing 9 supporting the clutch drum 33 at a portion between the pump housing 25 and the clutch drum 33. The passages 53 are employed as start-clutch lubricating passages 53 which mainly lubricate the electromagnetic clutch pack 28b and the start clutch pack 29 of the start clutch 4.

On the other hand, when the start-clutch housing 23 is installed to the front opening of the transmission case 21, the start clutch 4 is enclosed in the start-clutch case 51 fixed to the transmission case 21 so that the lubricating oil for the start clutch 4 does not splash into the start-clutch housing 23. Further, in order to firmly return the lubricating oil to an oil pan 54, a plurality of oil catch ribs 55 are formed at an inner and lower portion of the start clutch case 51. More specifically, the oil catch ribs 55 are in turn located along the start-clutch rotational direction shown by an arrow in FIG. 2 at predetermined intervals. Furthermore, as shown by broken lines in FIG. 2, a longitudinal rib may be provided between the oil catch ribs 55 so that a closed space is defined thereby.

An opening 56 is formed at a rear wall of the start-clutch case 51, in order to return the oil stored in a space defined by the oil catch ribs 55 to an oil pan 54. Further, oil guide ribs 58 and an opening 59 are provided at the lower portion of the start-clutch housing 23 so as to form a lubricating oil return passage 57 shown in FIGS. 1 and 2. Accordingly, although the lubricating oil, which has already lubricated the start clutch 4, is temporally stayed in a space defined by the oil catch ribs 55, the stayed lubricating oil is smoothly returned to the oil pan 54 through the openings 56 and 59 and the lubricating oil return passage 57.

A controller 62 executes the control of the primary pulley 36, the secondary pulley 37, the forward clutch 43 and the rearward clutch 44 by means of a shift control section 61 shown in FIG. 4 as follows. The shift control section 61 is arranged to generate a shift control pressure Ps from the oil delivered from the oil pump 24 through a first pressure control valve 63 and to generate a forward and rearward changeover pressure $P_c$ from the excessive oil of the first pressure control valve 64 through a second pressure control valve 64.

First, the control of the primary pulley 36 and the secondary pulley 37 will be discussed.

The controller 62 calculates a target transmission ratio from a signal of an inhibitor switch 65 which detects a selected range selected by the driver from the parking (P) range, the neutral (N) range, the forward drive (D) range, and a rearward drive (R) range. Further, the controller 62 commands a stepping motor 68 to move a shift control valve 69 at a corresponding position. That is, the shift control valve 69 controls the V-shaped grooves of the primary pulley 36 and the secondary pulley 37 so as to achieve the target transmission ratio while using the shift control pressure $P_s$ as base pressure.

Next, the control of the forward clutch 43 and the rearward brake 44 will be discussed.

A forward and rearward changeover valve 70 in the shift control section 61 is mechanically operated in response to the range select command from the driver. When the parking (P) range or neutral (N) range is selected, both of the forward clutch 43 and the rearward clutch 44 drain the oil and are put in the inoperative state. Therefore, the vehicle is put in the stop state. When the forward drive (D) range is selected, the forward clutch 43 receives the forward and rearward changeover pressure $P_c$ and is put in the engaged state. Therefore, the vehicle is put in a forward running enabling state. When the rearward drive (R) range is selected, the rearward brake 44 receives the forward and rearward changeover pressure $P_c$ and is engaged. Therefore, the vehicle is put in a rearward running enabling state.

The controller 62 executes the engagement control of the electromagnetic clutch 28 of the start clutch 4. That is, when the controller 62 determines that the neutral (N) range or parking (P) range is selected on the basis of the signal of the inhibitor switch 65, the controller 62 puts the start clutch 4 into the disengaged state by canceling the energizing of the electromagnetic clutch 28. Accordingly, the stopping state of the vehicle is achieved by the combination of the above-mentioned disengagement of the forward clutch 43 and the rearward brake 44 and the disengagement of the start clutch 4, When the controller 62 determines that the forward drive (D) range or rearward drive (R) range is selected, the controller 62 puts the start clutch 4 in the engaged state by energizing the electromagnet 28a with the current i and thereby engaging the electromagnetic clutch 28. Accordingly, the forward or rearward running enabling state of the vehicle is achieved by the combination between the above-mentioned engagement of the forward clutch 43 or the rearward brake 44 and the engagement of the start clutch 4.

When the vehicle is started, the engagement speed of the electromagnetic clutch 28 and the transmission torque are controlled by gradually increasing the magnitude of the current applied to the electromagnet 28a. This control enables the vehicle to smoothly execute the forward start or rearward start.

Further, the supplying means in this embodiment includes a supply quantity controlling means for controlling the supply quantity of the lubricating oil according to the engagement state of the start clutch 4 and for supplying the quantity-controlled lubricating oil to the start clutch 4. Further, the shift control section 61 functions as a part of the supply quantity controlling means so as to execute the lubrication control of the start clutch 4 and the front part of the automatic transmission according to the control command of the controller 62.

Therefore, the supply quantity controlling means includes a lubrication control valve 100 acting as a supply quantity control valve provided in the shift control section 61 and an operating condition controlling means for varying the operating condition of the lubrication control valve 100, as shown in FIGS. 4 and 5. The lubrication control valve 100 is constructed by a valve originally existing in the shift control section 61. That is, the lubrication control valve 100 including chambers 100a, 100b, 100c, 100d, 100e, 100f and 100g is constituted by an originally existing lockup control valve, which has been used in a torque converter with a lockup mechanism although such a torque converter is not used in the automatic transmission of this embodiment according to the present invention.

As is the same as the case of the lockup control, the third control valve 80 controls the pressure of excessive oil flowed out from the second pressure control valve 64 and supplies the pressure controlled oil to the chamber 100c of the lubrication control valve 100. On the other hand, excessive oil flowed out from the third pressure control valve 80 is supplied to an oil cooler 200 through an orifice portion 201 and to the chambers 100e and 100f of the lubrication control valve 100. Further, the oil flowed out from the third pressure control valve 80 is supplied to a cooler relief ball 210.

A spool 101 is provided in the lubrication control valve 100 and has openings 101a, 101b and 101c which are communicated with each other. The openings 101b and 101c extend in a direction perpendicular to the axial direction of the spool 100. The opening 101a extends from the opening 101c toward a spring 102 along the axial direction of the spool 101. An open end of the opening 101a is closed by a plug 103. The spool 101 inserted in the lubrication control valve 100 is pushed downward by the spring disposed between an upper wall defining the chamber 100a and the end portion of the spool 101.

The operating condition controlling means of the supply quantity controlling means includes a solenoid valve 72. The controller 62 controls the operating condition of the solenoid valve 72 by varying the ON/OFF duty ratio in the pulse width modulation method. Therefore, an oil supply quantity supplied to the chamber 100g of the lubrication control valve 100 is controlled according to the solenoid valve 72, and the spool 101 in the lubrication control valve 100 is moved against the pressing force of the spring 102 according to the hydraulic pressure. Therefore, it becomes possible to control the stroke quantity of the spool 101 by varying the ON/OFF duty ratio of the solenoid valve 72, and to continuously vary the operating condition of the lubrication control valve 100.

If the duty ratio of the solenoid valve 72 is set at zero under a condition that the start clutch 4 is set at the disengaged condition or complete engaged condition, the solenoid valve 72 is closed so as to stop supplying oil to the chamber 100g of the lubrication control valve 100, and the spool 101 of the lubrication control valve 100 is positioned at a lower limit position shown in FIG. 4 due to the pushing force of the spring 102. When the spool 101 is located at the lower limit position and when excessive oil, which is supplied to the chamber 100c through the second pressure control valve 64, is supplied to the start clutch lubricating passage 53 through a chamber 100b as shown by arrow A1 in FIG. 4, a size of an opening 100h fluidly communicating the chambers 100c and 100b is set at minimum size by a land portion 101d of the spool 101.

Accordingly, by setting the duty ratio of the solenoid valve 72 at zero under the condition that the start clutch 4 is set at the disengaged condition or complete engaged condition, it becomes possible to set the lubrication oil quantity supplied to the start clutch 4 through the start-clutch lubricating passage 53 at a necessary minimum quantity.

Since the electromagnetic clutch 28 is put in the de-energized state under the condition that the start clutch 4 is put in the disengaged condition, the controller 62 can determine whether the start clutch 4 is put in the disengaged condition or in the complete engaged condition, by determining whether the electromagnetic clutch 28 is put in the de-energized condition or not.

Excessive oil supplied to the chamber 100f through the third pressure control valve 80 is flowed into the opening 101b from the opening 101c through the opening 101a and is then supplied to the front portion lubrication circuit 52 from the opening 101b through the chamber 101d, as shown by arrow A2 in FIG. 4.

Further, excessive oil supplied to the chamber 100e through the third pressure control valve 80 is flowed into the front portion lubrication circuit 52 from the opening 100e through the opening 101b and the chamber 100d, as shown by arrow A3 in FIG. 4. At this time, a size of an opening 100i fluidly communicating the opening 101b and the chamber 100d is at minimum size by the land 101e of the spool 101 set at the lowest position. Accordingly, it becomes possible to set the lubrication oil quantity supplied to the front portion of the automatic transmission through the front portion lubrication circuit 52 at a necessary minimum quantity, as is similar to the case of the lubrication oil quantity supplied to the start clutch 4 through the start-clutch lubricating passage 53.

Since a passage area of the opening 100h corresponds to the necessary minimum quantity of the lubrication oil, the other oil except for the oil supplied to the start clutch 4 and the front portion of the automatic transmission is supplied to the oil cooler 200. The control of the third pressure control valve 80 enables the lubrication oil quantity supplied to the start-clutch lubricating passage 53 and the lubrication oil quantity supplied to the front portion of the automatic transmission to be controlled according to the needs of the start clutch 4 and the automatic transmission.

On the other hand, when the duty ratio of the solenoid valve 72 is changed to a value greater than zero under a condition that the start clutch 4 is put in the slipping engaged condition, the oil pressure in the chamber 100g of the lubrication control valve 100 is controlled and the spool 101 inserted in the lubrication control valve 100 is moved against the spring 102. Herein, if the oil pressure in the chamber 10g is set at a maximum value by varying a duty ratio of the solenoid valve 72, the spool 101 in the lubrication control valve 100 is set at an upper limit position shown in FIG. 5.

When the spool 101 is located at the upper limit position as shown in FIG. 5, excessive oil supplied to the chamber 100c from the second pressure control valve 64 is supplied to the start-clutch lubricating passage 53 through a passage as is similar to that in FIG. 4, as shown by an arrow A1 of FIG. 5. However, since the land portion 101d of the spool 101 is upwardly moved, the opening 100h is set maximum. Accordingly, the supply quantity of lubrication oil supplied to the front portion of the automatic transmission through the front portion lubricating passage 52 is set at a necessary maximum quantity.

That is, when the start clutch 4 is put in the slipping connect state, by varying the duty ratio of the solenoid valve 72 by a value greater than zero, it becomes possible to freely control the stroke of the spool 101 within a range between the lowermost position shown in FIG. 4 and the uppermost position shown in FIG. 5 although the position of FIG. 4 is strictly excepted, according to the change of the duty ratio of the solenoid valve 72. That is, it is possible to continuously vary and control the lubrication oil quantity supplied to the start-clutch lubricating passage 53 according to the opening area of the opening 100h of the lubrication control valve 100.

The opening area of the opening 100i is also continuously varied according to the stroke of the spool 101, and the supply quantity of lubrication oil to the front portion lubricating passage 53 is also controlled. During this period, the opening area of the opening 100i is decreased according to the increase of the opening area of the opening 100h. This enables the lubrication oil quantity supplied to the front portion lubricating passage 52 to be kept constant as far as the spool 101 is located in the predetermined stroke range.

Figure 6:
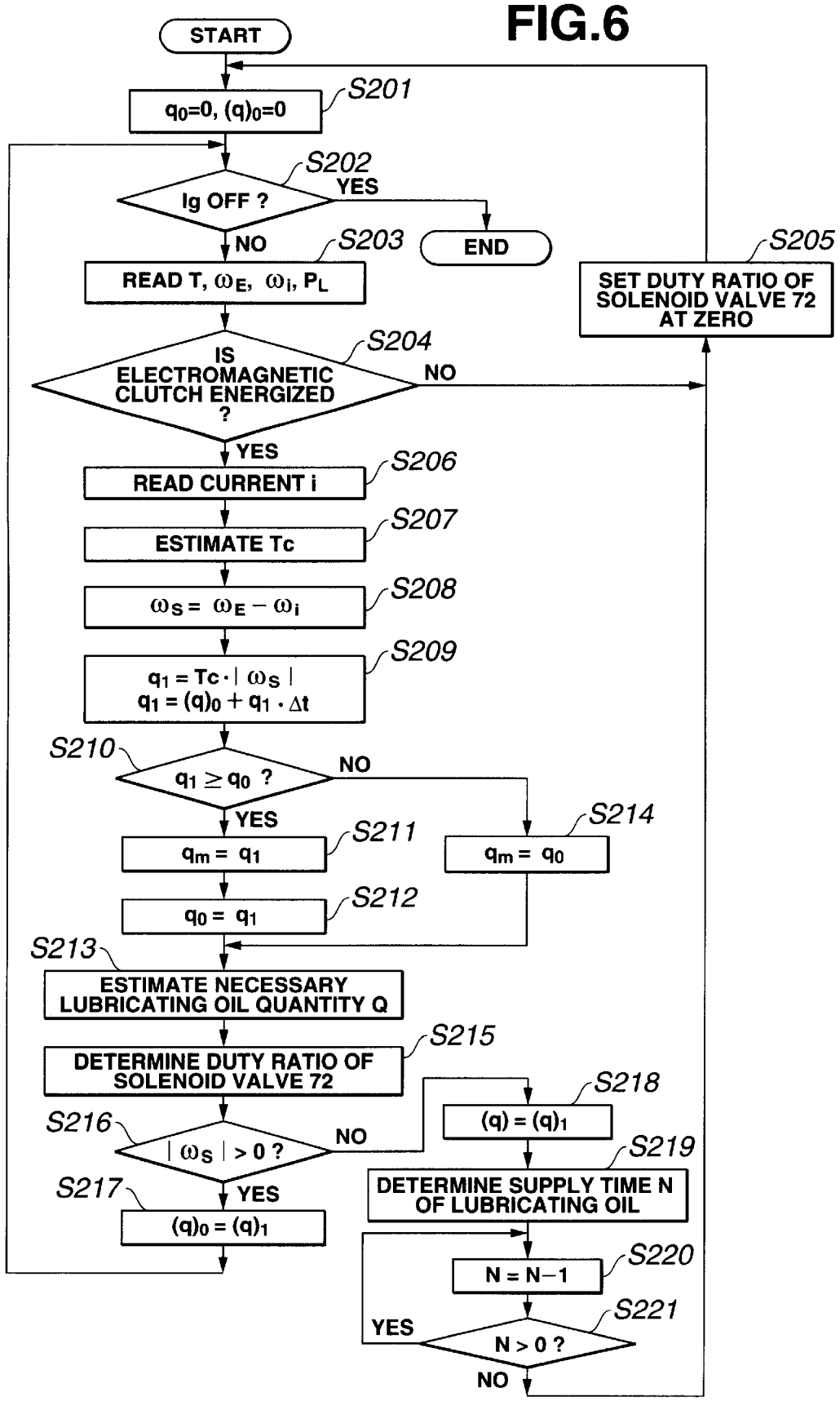
FIG. 6 is a flowchart showing a lubrication control program executed by the start clutch lubrication control apparatus according to the present invention.

FIG. 6 is a flowchart showing a lubrication control program employed as a lubricating method of a start clutch of the automatic transmission according to the present invention. The controller 62 executes a control for varying the duty ratio according to the engaged state of the start clutch 4 by using this program. In order to control the operating condition of the solenoid valve 72 by varying the ON/OFF duty ratio according to the engaged condition of the start clutch 4, the first embodiment employs the following lubrication control theory.

That is, when the start clutch 4 is put in the disengaged state, the electromagnetic clutch 28 of the start clutch 4 is put in a de-energized state. On the other hand, when the start clutch 4 is put in the slipping connect state or the complete engaged state, the electromagnetic clutch 28 is put in the energized state. Therefore, the controller 62 can determine that the start clutch 4 is put in the disengaged state when the electromagnetic clutch 28 is put in the de-energized state. Further, the controller 62 can determine that the start clutch 4 is put in the slipping connect state or complete engaged state, by detecting a relative rotation between input and output members of the start clutch 4.

As shown in FIG. 1, when the forward clutch 42 of the automatic transmission is engaged, the rotation of the input shaft 5 acting as an input member is directly transmitted to the primary pulley 36 acting as an output member. When the start clutch 4 is put in the completely engaged state, the rotational speed of the primary pulley 36 becomes equal to the rotational speed of the input shaft 5. Therefore, by obtaining the relative rotational speed between the rotational speeds of the input shaft 5 and the primary pulley 36, which relative rotational speed represents the relative rotational state between the input and output members of the start clutch 4, it becomes possible to determine that the start clutch 4 is put in the completely engaged state or in the slipping connect state.

Since the rotational speed of the input shaft 5 is equal to an engine rotational speed, it is possible to obtain the engine rotational speed from an input signal of an engine rotational speed sensor 120.

Further, it is possible to obtain the rotational speed of the primary pulley 36 from an input signal of a rotational speed sensor 122 of the primary pulley 36. Therefore, when the engine rotational speed is $\omega_E$, the rotational speed of the primary pulley 36 is $\omega_i$, the relative rotational speed between $\omega_E$ and $\omega_i$ is obtained as a relative slip angular speed $\omega_S$ of the electromagnetic clutch 28, and the relative slip angular speed $\omega_S$ is treated as the relative rotational state between the input shaft 5 and the primary pulley 36.

Figure 7A:
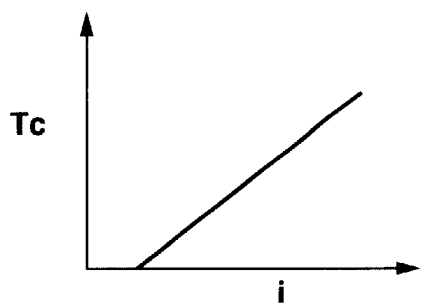
FIGS. 7A to 7D are maps employed in the control program of FIG. 6.

Defining that the input torque (hereinafter, called as transmission torque) transmitted by the electromagnetic clutch 28 is Tc, and that the current of the electromagnet 28a corresponds to the current quantity i of the electromagnetic clutch 28 of the electromagnetic start clutch 4, the transmission torque Tc and the current quantity i have a proportional relationship as shown in FIG. 7A. Therefore, it is possible to estimate the transmission torque Tc from the current quantity i of the electromagnetic clutch 28.

Further, when the start clutch 4 is put in the slipping connect state, the duty ratio of the solenoid valve 72, which controls the supply quantity of lubrication oil to the front portion lubricating passage 52 and the start clutch lubricating passage 53, can be obtained on the basis of the heated state of the start clutch 4.

Herein, the heated state of the start clutch 4 is known by obtaining a heat ratio $q=Tc\times\omega_S$ and a maximum heat ratio qm of the electromagnetic clutch 28 under a slipping state. Further, the necessary lubrication oil quantity Q can be determined by measuring an oil-pan oil temperature T by means of an oil temperature sensor 124 set in the oil pan 54 and by retrieving a map representative of a relationship (Q=(qm, T)) between the necessary lubrication oil quantity Q, the maximum heat ratio qm and the oil-pan oil temperature T.

Next, the ON/OFF duty ratio DUTY employed for controlling the operating condition of the solenoid valve 72 so as to supply the necessary lubricating oil quantity Q to the start clutch 4. Herein the ON/OFF duty ratio DUTY is determined from a map representative of a relationship among the necessary lubrication quantity Q, the line pressure $P_L$ (shift control pressure $P_s$) and the ON/OFF duty ratio DUTY as shown in FIG. 7C where the ON/OFF duty ratio DUTY is represented by an equation DUTY=g(Q, $P_L$) employing the necessary lubrication quantity Q and the line pressure $P_L$ as a parameter.

Accordingly, the solenoid valve 72 works according to the ON/OFF duty ratio so that the necessary lubrication oil quantity Q is supplied to the start clutch 4. More specifically, the solenoid valve 72 supplies the lubrication oil pressurized at a pressure corresponding to the determined duty ratio DUTY to the chamber 100g of the lubrication control valve 100 so as to control the stroke quantity of the spool 101 in the lubrication control valve 100.

On the basis of the above-discussed control theory, the control of the lubrication oil quantity is executed by the process shown in a flowchart of FIG. 6 in this first embodiment.

At step S201 the controller 62 resets the heat ratio $q_0$ and a heat quantity $(q)_0$ ($q_0$=0, $(q)_0$=0).

At step S202 the controller 62 determines whether an ignition Ig is put in the OFF state or not. When the determination at step S202 is affirmative, that is, when it is determined that the ignition Ig is put in the OFF state, the program proceeds to an end block to terminate the present routine. When the determination at step S202 is negative, the program proceeds to step S203.

At step S203 the controller 62 reads the oil-pan oil temperature T at this time, the engine rotational speed $\omega_E$ detected by the engine rotational speed sensor 120, the primary-pulley rotational speed $\omega_i$ and the line pressure (shift control pressure $P_s$) $P_L$.

At step S204 following the execution of step S203, the controller 62 determines whether the electromagnetic clutch 28 is energized or not. When the determination at step S204 is negative, that is, when it is determined that the electromagnetic clutch is de-energized, the program proceeds to step S205. That is, if the electromagnetic clutch 28 is de-energized, the start clutch 4 is put in the disengaged state.

At step S205 the controller 62 sets the duty ratio DUTY of the solenoid valve 72 at zero (DUTY=0). By the execution of step S205, the spool 101 of the lubrication control valve 100 is moved to the position shown in FIG. 4 and therefore the lubricating oil quantity to be supplied to the front portion lubrication passage 52 and the start clutch lubrication passage 53 is set at the necessary minimum quantity. Following this, the program returns to step S201.

When the determination at step S204 is affirmative, that is, when the start clutch 4 is put in the slipping connect state or the complete engaged state, the program proceeds to step S206. When the start clutch 4 is put in the slipping connect state, it is preferable that the spool 101 of the lubrication control valve 100 is stroked within the range between the spool position shown in FIG. 4 and the spool position shown in FIG. 5 according to the engaged state of the start clutch 4. The engaged state of the start clutch 4 affects the heat quantity thereof. When the engaged state of the start clutch 4 is changed from the slipping connect state to the complete engaged state, it is preferable that the lubricating oil quantity is not quickly decreased to the necessary minimum quantity but the predetermined quantity of the lubricating oil is supplied for a predetermined time period according to the heated condition of the start clutch 4. Further it is preferable that the supply quantity of the lubricating oil is decreased at the minimum quantity after the start clutch 4 is cooled for the predetermined time period.

Therefore, in order to stroke the spool 101 so as to supply the necessary quantity Q of the lubricating oil to the chamber 100g of the lubrication control valve 100 according to the engaged state of the start clutch 4, the controller 62 executes the control for obtaining the desired ON/OFF duty ratio corresponding to the desired stroke of the spool 101. That is, the program proceeds to step S206.

At step S206 the controller 62 reads the current value i applied to the electromagnet 28a.

At step S207 the controller 62 estimates the transmission torque Tc corresponding to the current value i from the map shown in FIG. 7A.

At step S208 the controller 62 calculates the relative slip angular speed $\omega_s$ by substituting the engine rotational speed $\omega_E$ and the primary pulley rotational speed $\omega_i$ read at step S203 into the equation $\omega_s = \omega_E - \omega_i$.

At step S209 the controller 62 calculates the present heating ratio $q_1$ and an accumulated heat quantity $(q)_1$ from the equations $q_1 = Tc \cdot |\omega_s|$ and $(q)_1 = (q)_0 + q_1 \cdot \Delta t$ and the transmission torque Tc and the relative slip angular speed $\omega_s$.

At step S210 the controller 62 determines whether or not the present heat ratio $q_1$ is greater than or equal to the initial heat ratio $q_0$, in order to obtain the maximum heat ratio qm. When the determination at step S210 is affirmative ($q_1 \geq q_0$), the program proceeds to step S211 wherein the present heat ratio $q_1$ is employed as the maximum heat ratio $q_m$ ($q_1=q_m$). Following the execution of step S211, the program proceeds to step S212 wherein the present heat ratio $q_1$ is employed as the initial heat ratio ($q_0=q_1$). Thereafter, the program proceeds to step S213. When the determination at step S210 is negative ($q_1<q_0$), the program proceeds to step S214 wherein the initial heat ratio $q_0$ is employed as the maximum value $q_m$ ($q_m=q_0$). Thereafter, the program proceeds to step S213.

Figure 7B:
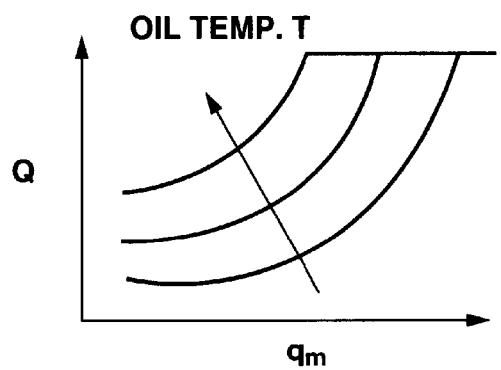
Figure 7C:
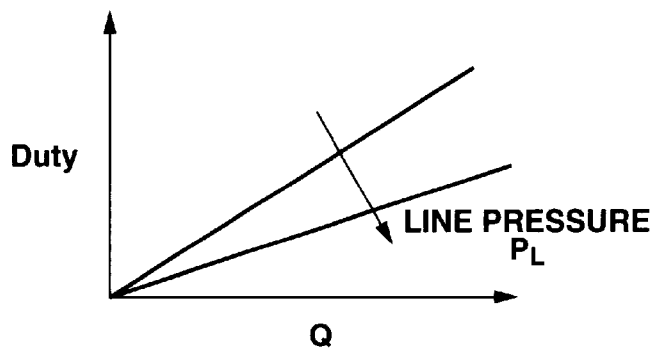

At step S213 the controller 62 estimates the necessary lubricating-oil quantity Q from the map shown in FIG. 7B, and the oil-pan oil temperature T and the maximum heat ratio $q_m$.

At step S215 following the execution of step S213, the controller 62 determines the ON/OFF duty ratio DUTY for controlling the solenoid valve 72, on the basis of the map of FIG. 7C and from the line pressure $P_L$ read at step S203 and the necessary lubricating oil quantity Q obtained at step S213. With this arrangement, it becomes possible to variable set the lubricating oil quantity on the basis of the heating condition of the start clutch 4.

At step S216 the controller 62 determines whether $|\omega_s|>0$. When the determination at step S216 is affirmative, that is, when it is determined that the start clutch 4 is put in the slipping connect state, the program proceeds to step S217 wherein the present heating quantity $(q)_1$ is employed as the initial heat quantity $(q)_0$ $((q)_0=(q)_1)$. Then the program returns to step S202.

When the determination at step S216 is negative ($\omega_s=0$), that is, when it is determined that the start clutch 4 is put in the complete engaged state, it is necessary to execute the processing for setting the duty ratio DUTY of the solenoid valve 72 at zero so as to decrease the supply quantity at the necessary minimum quantity. Further, when the start clutch 4 is put in the complete engaged state, a special control for cooling the start clutch 4 as mentioned above is executed. More specifically, the duty ratio DUTY is not directly decreased to zero but the lubricating oil quantity Q is kept at the present quantity, which is larger than the minimum quantity for a supply continuing time period N. This supply continuing time period N is determined from the accumulated heat quantity $(q)_1$ $(=\int q_1 dt)$ obtained at step S209, and thereafter the supplied oil quantity is decreased to the minimum quantity by executing the control for setting the duty ratio DUTY at zero.

More specifically, when the determination at step S216 is negative ($\omega_s=0$), the program proceeds to step S218 wherein the accumulated heat quantity (q) is set at $(q)_1$ $((q)=(q)_1)$.

Figure 7D:
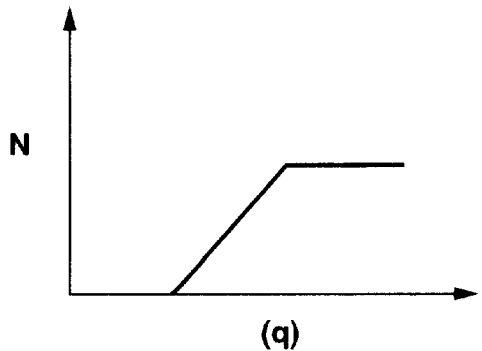

At step S219 following the execution of step S218, the controller 62 determines the lubricating-oil supply continuing period N from the map shown in FIG. 7D and the accumulated heat quantity (q). With this arrangement, it becomes possible to variably set the lubricating-oil supply continuing period N during which the lubricating oil quantity greater than the minimum quantity is kept. The lubricating oil quantity greater than the minimum quantity is determined on the basis of the accumulated heat quantity (q).

At step S220 the controller 62 counts down the lubricating-oil supply period N by executing the calculation N=N−1.

At step S221 the controller 62 determines whether N>0 or not. When the determination at step S221 is affirmative, the program returns to step S220. That is, until the lubricating-oil supply continuing period N is elapsed, the steps S220 and S221 are repeated. When the determination at step S221 is negative, that is, when the lubricating-oil supply period N is elapsed, the program proceeds to step S205 wherein the duty ratio DUTY of the solenoid valve 52 is set at zero (DUTY=0). Thereafter the program returns to step S201. By the execution of step S205, the spool 101 of the lubrication control valve 100 is moved to the position shown in FIG. 4, and the minimum quantity of lubricating oil quantity is supplied to the start clutch 4 and the front portion of the automatic transmission through the start-clutch lubrication passage 53 and the front-portion lubrication passage 52.

Accordingly, When the start clutch 4 is put in the complete engaged state, the lubricating oil quantity is set at a quantity at the time when the condition of the start clutch 4 reaches $\omega_s=0$, for the lubricating-oil supply continuing period N.

The automatic transmission employing the start clutch lubrication control apparatus converts the rotation inputted from a power source through the electromagnetic clutch 4 and outputs it. Herein, the lubricating oil supplied to the start clutch 4 through the start clutch lubrication passage 53 is used for the lubrication of the electromagnetic start clutch 4 and the front portion of the automatic transmission. The control of the lubricating-oil quantity supplied to the passage 53 is executed by using a lockup control valve (which is used in case that a lockup converter is employed) as a lubrication control valve 100 and by controlling the stroke quantity of the spool 101 installed in the lubrication control valve 100.

Accordingly, a passage of the automatic transmission, which has been used as an inlet passage in the case that a torque converter is employed and is set at a lockup condition, is used as the front portion lubrication passage 52. Further another passage of the automatic transmission, which has been used as an outlet passage in case that the torque convert is employed and is set at the lockup condition, is used as the start clutch lubrication passage 53. That is, the passages for the lockup control of the torque converter, which is not employed in this embodiment, are used as the lubrication passages 52 and 53. Further, it is possible to employ the lockup control valve in the control of the lubricating oil quantity supplied to the lubrication passage 52 and 53.

In the supply quantity controlling means, the operating condition of the lubrication control valve 100 is controlled by controlling the stroke quantity of the spool 101 of the lubrication control valve 100. The stroke quantity of the spool 101 is controlled by varying the duty ratio DUTY indicative of the operating condition of the solenoid valve 72 of the operating condition controlling means. More specifically, the duty ratio DUTY of the solenoid valve 72 is varied in a manner that the controller 62 executes the program shown in FIG. 6.

The change of the duty ratio DUTY is executed on the basis of the engaged state of the start clutch 4. The disengaged state of the start clutch 4 is determined from the de-energized state of the electromagnetic clutch 28. The slipping connect state or the complete engaged state of the start clutch 4 is determined from the relative slip angular speed $\omega_s$ of the electromagnetic clutch 28, which is a difference between the engine rotational speed $\omega_E$ and the rotational speed $\omega_i$ of the primary pulley 36.

Further, when it is determined that the start clutch 4 is put in the slipping connect state, the necessary lubricating-oil quantity Q to be supplied to the start clutch 4 is determined according to the transmission torque Tc obtained from the current quantity i of the electromagnetic clutch 28 and the maximum heating ratio $q_m$ obtained from the relative slip angular speed $\omega_s$. Further, the duty ratio DUTY corresponding to the necessary rubricating oil quantity is also obtained.

The supplying means for supplying the lubricating oil to the start clutch 4 is employed in the start clutch lubrication control apparatus and comprises the supply quantity controlling means which is arranged to supply the minimum quantity of the lubricating oil to the start clutch 4 when the start clutch 4 is put in the complete engaged state or the disengaged state, and to supply the lubricating oil whose quantity is varied according to the slipping connect condition.

Therefore, it becomes possible to supply the necessary quantity of the lubricating oil to the start clutch 4 according to the engagement state of the start clutch 4. Particularly, when the start clutch 4 is operating and in the slipping connect state, the quantity of the lubricating oil is varied according to the engagement state of the start clutch 4. That is, the supply quantity of the lubricating oil to the start clutch 4 is varied according to the change of the engagement state during the slipping connect state and the degree of the slip, and therefore it becomes possible to prevent the lubricating oil from being excessively supplied. This effectively prevents the generation of the dragging torque.

Further, in this embodiment the supply quantity controlling means comprises the lubrication control valve 100 acting as a supply quantity control valve for controlling the supply quantity of the lubricating oil supplied to the start clutch 4 and the operating condition controlling means for varying the operating condition of the lubrication control valve 100 according to the slipping connect state of the start clutch 4. Since the operating condition controlling means is arranged to vary the operating condition of the lubrication control valve 100 according to the slipping state of the start clutch 4, it becomes possible to control the supply quantity of the lubricating oil supplied to the start clutch according to the operating condition of the lubrication control valve 100.

Furthermore, since the operating condition controlling means comprises the solenoid valve 72 for controlling the operation of the lubrication control valve 100 and is arranged to control the operating condition of the solenoid valve 72 by varying the duty ratio DUTY, the operating condition of the solenoid valve 72 is accurately controlled by varying the duty ratio DUTY. Therefore the supply quantity of the lubricating oil is accurately supplied to the start clutch 4 according to the engagement state of the start clutch 4.

Additionally, the operating condition controlling means is arranged to determine the disengaged state of the start clutch 4 from the de-energized condition of the electromagnetic clutch 28 and to determine the slipping connect state and the complete engaged state of the start clutch 4 from the relative slip angular speed $\omega_s$ which is a relative rotational speed between the input shaft 5 acting as an input member of the start clutch 4 and the primary pulley 36 acting as an output member of the start clutch 4. Further, when the start clutch 4 is put in the slipping connect state, the duty ratio DUTY is obtained on the basis of the heating condition obtained from the transmission torque Tc of the start clutch 4 and the heating condition obtained from the relative rotational speed.

Accordingly, it becomes possible to determine the engaged state of the start clutch 4 from the current quantity i and the relative slip angular speed $\omega_s$. Therefore, when it is determined that the start clutch 4 is put in the complete engaged state or in the disengaged state, the supply quantity controlling means supplies the minimum quantity of the lubricating oil to the start clutch 4. Further, when it is determined that the start clutch 4 is put in the slip connect state, the operating condition controlling means variablly sets the lubricating oil quantity obtained from the transmission torque Tc and the relative slip angular speed $\omega_s$ of the start clutch 4.

Therefore, when the start clutch 4 is put in the slipping connect state, the operating condition of the solenoid valve 72 is accurately varied according to the slipping connect state of the start clutch 4 by variably setting the lubricating oil quantity on the basis of the heating condition of the start clutch 4. By this operation, the lubricating oil quantity required by the start clutch 4 is properly supplied to the start clutch 4 This firmly prevents the excessive lubricating oil from being supplied to the start clutch 4.

Further, since the transmission torque Tc of the start clutch 4 is obtained from the current quantity i of the start clutch 4, that is, since the transmission torque Tc is obtained by a simple and compact structure without newly providing sensors, it is possible to accurately construct the start clutch lubrication control apparatus of the automatic transmission.

The accumulated heat quantity $(q)_1$ is estimated on the basis of the transmission torque Tc and the relative angular speed $\omega_s$ of the start clutch 4. Further, when the engagement state of the start clutch 4 is changed from the slipping connect state to the complete engaged state, the lubricating-oil supply quantity is set at the quantity greater than the minimum quantity for the lubricating-oil supply continuing period N which is variably set. Therefore, by supplying the lubricating oil, whose supply quantity is greater than the minimum quantity, to the start clutch 4 for the period determined on the basis of the accumulated heat quantity $(q)_1$, it becomes possible to sufficiently cool the start clutch 4 and to then supply the minimum quantity of the lubricating oil to the start clutch 4.

Furthermore, since the supply quantity controlling means is arranged to supply the excessive oil generated during the lubrication control for the start clutch 4 to the oil cooler 200, it is possible to effectively cools the lubricating oil. Particularly, when the start clutch 4 is put in the disengaged state or the complete engaged state, the supply quantity controlling means supplies the necessary quantity of the lubricating oil to the start clutch 4. Therefore, a large quantity of excessive lubricating oil generated during the control of the supply quantity controlling means is supplied to the oil cooler 200 and is cooled thereby. Accordingly, it is possible to effectively cool the whole of the lubricating oil. This arrangement enables the supply quantity of the lubricating oil supplied to the start clutch 4 during the slipping connect state to be suitably determined and prevents the generation of the dragging torque.

Figure 8:
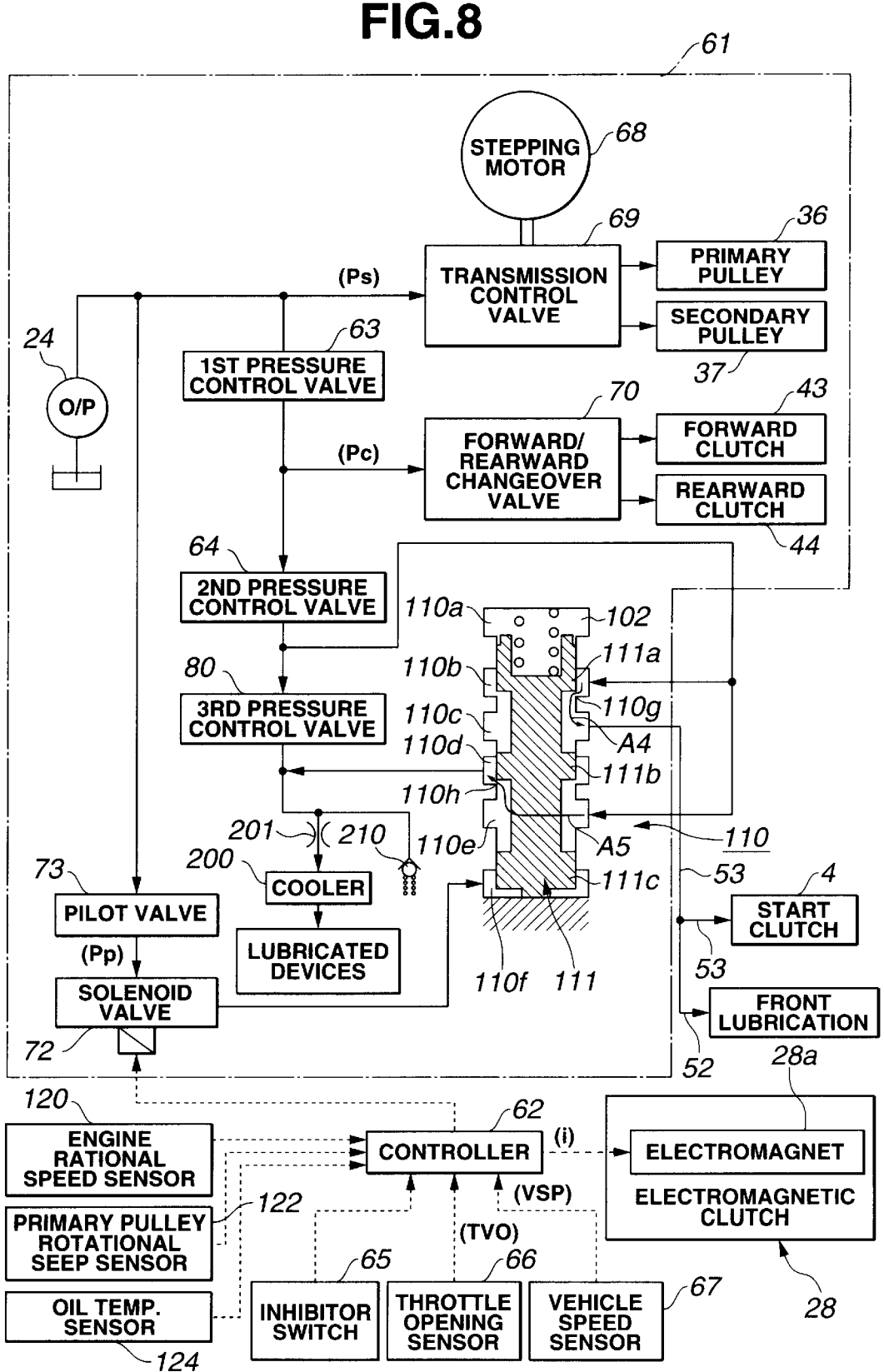
FIG. 8 is a schematic block diagram showing a shift control section of the automatic transmission of a second embodiment wherein a lubrication control valve set in a maximum flow quantity state is disclosed.
Figure 9:
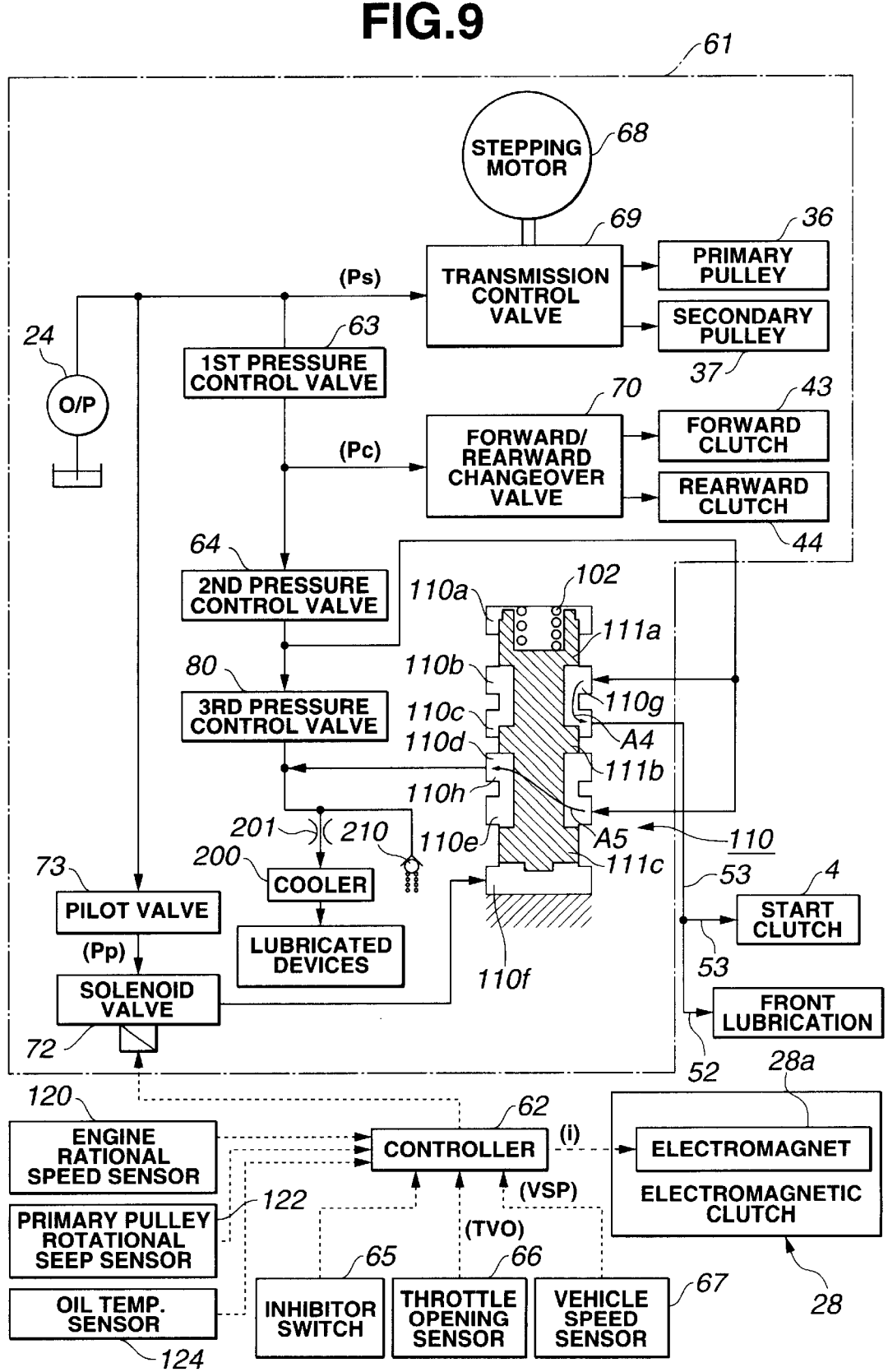
FIG. 9 is a schematic block diagram showing a shift control section of the automatic transmission of the second embodiment wherein the lubrication control valve set in a maximum flow quantity state is disclosed.

Referring to FIGS. 8 and 9, there is shown a second embodiment of the start clutch lubrication control apparatus according to the present invention.

FIG. 8 shows the state of a lubrication control valve 110 put in a condition that the start clutch 4 is put in the complete engaged state or the disengaged state as is the same as that shown in FIG. 4 of the first embodiment. In this state shown in FIG. 8, a spool 111 is put in the state that the minimum quantity of the lubricating oil is supplied to the start clutch lubrication passage 53 and the front portion lubrication passage 52. Further, FIG. 9 shows the state of the lubrication control valve put in a condition that start clutch 4 is put in the slipping connect state as is the same as that in FIG. 5 of the first embodiment. In this state shown in FIG. 9, the spool 111 is put in the state that the maximum quantity of the lubricating oil is supplied to the start clutch lubrication passage 53 and the front portion lubrication passage 52.

The start clutch lubrication control apparatus of the second embodiment is basically constructed as is the same as the structure shown in FIG. 1 of the first embodiment. In this second embodiment, the lubrication control valve 110 is employed instead of the lubrication control valve 100 of the first embodiment. Further, the spool 111 is installed in the lubrication control valve 110 instead of the spool 101. The lubrication control valve 110 has chambers 110a, 110b, 110c, 110d, 110e and 110f, and the spool 111 includes land portions 111a, 111b and 111c. Although in the first embodiment the lubricating oil controlled in pressure by the third pressure control valve 80 is supplied to the start clutch lubrication passage 53 and the excessive oil of the third pressure control valve 80 is supplied to the front portion lubrication passage 52, in this second embodiment the lubricating oil controlled in pressure by the third pressure control valve 80 is supplied to the start clutch lubrication passage 53 and the start clutch lubrication passage 53 is branched at the outside of the lubrication control valve 110 into the front portion lubrication passage 52 through which the lubrication oil is supplied to the front portion of the automatic transmission.

In this second embodiment, the lubrication control of the start clutch lubrication control apparatus is executed by the same manner shown in FIG. 6 of the first embodiment.

In the start clutch lubrication control apparatus of the second embodiment, the lubricating oil controlled in pressure by the third pressure control valve 80 is flowed into the chambers 110b and 110e of the lubrication control valve 110. The lubricating oil supplied to the chamber 110b of the lubrication control valve 110 flows to the chamber 110c and then flows to the start clutch lubrication passage 53 and the front portion lubrication passage 52 branched from the passage 53. On the other hand, the lubricating oil flowed into the chamber 110e then flows to the chamber 110d, and is supplied to the oil cooler 200 through an orifice 201 and to a cooler relief ball 210. The spool 111 installed in the lubrication control valve 110 is pushed in the downward direction of FIG. 8 by a spring provided between an upper wall defining the chamber 110a and an upper portion of the spool 111.

Further, in this second embodiment, when the start clutch 4 is put in the engaged state, the supply quantity of the lubricating oil is controlled by varying the duty ratio DUTY of the solenoid valve 72. According to the operating condition of the solenoid valve 72, the lubricating oil quantity supplied to the chamber 110f is controlled, and the spool 111 in the lubrication control valve 111 is moved according to the oil pressure at the chamber 110f against the biasing force of the spring 102. Therefore, since it is possible to control the stroke quantity of the spool 111 by varying the duty ratio DUTY of the solenoid valve 72, it becomes possible to continuously vary the operating condition of the lubrication control valve 110.

When the start clutch 3 is put in the disengaged state or the complete engaged state, by setting the duty ratio DUTY of the solenoid valve 72 at zero, the solenoid valve 72 is closed to stop flowing the lubricating oil and the spool 111 of the lubrication control valve 110 is located at the lower limit position shown in FIG. 8 due to the biasing force of the spring 102. When the spool 111 is located at the lower limit position shown in FIG. 8, the excessive oil supplied to the chamber 110b is supplied to the start clutch lubrication passage 53 through the camber 110c as shown by an arrow A4 in FIG. 8. During this condition, an opening 110g between the chambers 110b and 110c are set at the minimum opening by the land portion 111a of the spool 111. Accordingly, the lubricating oil quantity supplied to the start clutch lubrication passage 53 and the front portion lubrication passage 52 is set at the necessary minimum quantity. Therefore, when the start clutch 4 is put in the disengaged state or the complete engaged state, the necessary minimum quantity of the lubricating oil is supplied to the start clutch 4 through the start clutch lubrication passage 53 by setting the duty ratio of the solenoid valve 72 at zero.

As is similar to the first embodiment, when the start clutch 4 is put in the disengaged state in the second embodiment, the electromagnetic clutch 28 is put in the de-energized state. Therefore, it is possible to determine whether the start clutch 4 is put in the disengaged state or in the complete engaged state in a manner that the controller 62 determines whether the electromagnetic clutch 28 is de-energized or not.

Further, the excessive oil supplied from the chamber 110e of the lubrication control valve 110 in the excessive oil flowed out from the second pressure control valve 64 is flowed into the oil cooler 200 through the chamber 110d as shown by an arrow A5 of FIG. 8. During this period, an opening 110h between the chambers 110d and 110e is set at the minimum opening by the land portion 111b of the spool 111. Accordingly, the lubricating oil quantity flowed to the cooler 200 is set at the minimum quantity.

By varying the duty ratio of the solenoid valve 72 to a value greater than zero under a condition that the start clutch 4 is put in the slipping connect state, the oil pressure in the chamber 110f is controlled according to the change of the duty ratio, and therefore the spool 111 in the lubrication control valve 110 is stroked against the biasing force of the spring 102. If the oil pressure in the chamber 110f is set at the maximum pressure by varying the duty ratio of the solenoid valve 72, the spool 111 of the lubrication control valve 110 is positioned at an upper limit position shown in FIG. 9.

When the spool 111 is positioned at the upper limit position shown in FIG. 9, the excessive oil supplied to the chamber 110b is supplied to the start clutch lubrication passage 53 though the path as shown by an arrow A4 of FIG. 9, as is similar to that of FIG. 8. However, as shown in FIG. 9, since the land portion 111a of the spool 111 is moved upward, the opening 110g is set at the maximum opening. Accordingly, it becomes possible to set the lubricating oil quantity supplied to the start clutch 4 through the start clutch lubrication passage 53 at the necessary maximum quantity. Further, it becomes possible to also set the lubricating oil quantity supplied to the front portion of the automatic transmission through the front portion lubrication passage 52 at the necessary maximum quantity.

The excessive oil supplied to the chamber 110e in the excessive oil flowed from the second pressure control valve 64 is supplied to the cooler 200 through the chamber 110d as shown by the arrow A5 in FIG. 9. During this period, the land portion 111e of the spool 111 has been moved upward and therefore the opening 110h is set at the maximum opening. Accordingly, the lubricating oil quantity supplied to the oil cooler 200 is set at the maximum quantity. As is similar to the first embodiment, when the start clutch 4 is put in the slipping connect state, it is possible to freely control the stroke of the spool 111 in the lubrication control valve 110 between the lower limit position shown in FIG. 8 (except for the lower limit position) and the upper limit position shown in FIG. 9 according to the change of the duty ratio of the solenoid valve 72 by varying the duty ratio of the solenoid valve 72 by a value greater than zero. That is, the lubricating oil quantity supplied to the start clutch lubrication passage 53 and the front portion lubrication passage 52 is continuously varied according to the opening area of the opening 110g determined by the position of the spool 111.

If it is desired to increase the lubricating oil quantity supplied to the start clutch 4 relative to the front portion lubrication passage 52, an orifice may be disposed in the front portion lubrication passage 52. Such a provision of the orifice enables the lubricating oil to be controllably supplied to the start clutch 4 and the front portion of the transmission.

The entire contents of Japanese Patent Application No. 2000-287183 filed on Sep. 21, 2000 in Japan are incorporated herein by reference.

Although the invention has been described above by reference to certain embodiments of the invention, the invention is not limited to the embodiments described above. Modifications and variations of the embodiment described above will occur to those skilled in the art, in light of the above teaching. For example, although the lubricating oil quantity is increased by a predetermined quantity after the start clutch 4 is completely engaged, the invention is not limited to this and the lubricating oil quantity may be promptly decreased to the minimum quantity if this control system is employed to a right weight vehicle which generates a small heating quantity of the start clutch. Such arrangement further decreases the generation of the dragging torque. The scope of the invention is defined with reference to the following claims.

What is claimed is:

1. A lubrication control apparatus for a start clutch of an electromagnetic type, the start clutch being disposed between a power source and an automatic transmission to transmit the power of the power source to the automatic transmission, the start clutch lubrication apparatus comprising:
    oil supplying means for supplying lubricating oil to the start clutch, which determines that the start clutch is put in a disengagement state from a de-energized state of the start clutch, and determines that the start clutch is put in one of a slipping connect state and a completely engaged state from a relative rotation between input and output members of the start clutch;
    oil returning means for returning the lubricating oil from the start clutch to the automatic transmission; and
    quantity varying means for varying a supply quantity of the lubricating oil supplied to the start clutch on the basis of a clutch heated condition obtained from a transmission torque of the start clutch and the relative rotation when the start clutch is put in the slipping connect state.

2. The lubrication control apparatus as claimed in claim 1, wherein the quantity varying means varies the supply quantity of the lubricating oil when the start clutch is put in a slipping connect state.

3. A lubrication control apparatus for a start clutch of an electromagnetic type, the start clutch being disposed between a power source and an automatic transmission to transmit the power of the power source to the automatic transmission, the start clutch lubrication apparatus comprising:
    oil supplying means for supplying lubricating oil to the start clutch, comprising supply quantity controlling means for supplying a necessary minimum supply quantity of the lubricating oil to the start clutch when the start clutch is put in a completely engaged state;
    oil returning means for returning the lubricating oil from the start clutch to the automatic transmission; and
    quantity varying means for varying a supply quantity of the lubricating oil supplied to the start clutch according to a slipping state of the start clutch.

4. The lubrication control apparatus as claimed in claim 3, wherein the supply quantity controlling means comprises a supply quantity control valve for controlling the supply quantity of the lubricating oil to the start clutch and operating condition controlling means for varying an operating condition of the supply quantity control valve according to the slipping connect state of the start clutch.

5. The lubrication control apparatus as claimed in claim 4, wherein the operating condition controlling means comprises a solenoid valve for controlling the supply quantity control valve and duty ratio varying means for varying a duty ratio applied to the solenoid valve.

6. The lubrication control apparatus as claimed in claim 3, wherein the supply quantity controlling means supplies excessive oil generated during the control of the lubrication oil to an oil cooler.

7. A lubrication control apparatus for a start clutch of an electromagnetic type, the start clutch being disposed between a power source and an automatic transmission to transmit the power of the power source to the automatic transmission, the start clutch lubrication apparatus comprising:

oil supplying means for supplying lubricating oil to the start clutch, comprising supply quantity controlling means for supplying a necessary minimum supply quantity of the lubricating oil to the start clutch when the start clutch is put in one of a completely engaged state and a disengaged state, the supply quantity controlling means comprising
  a supply quantity control valve for controlling the supply quantity of the lubricating oil to the start clutch; and
  operating condition controlling means for varying an operating condition of the supply quantity control valve according to a slipping connect state of the start clutch, the operating condition controlling means determining that the start clutch is put in a disengaged state from a de-energized state of the start clutch, that the start clutch is put in one of the slipping connect state and a completely engaged state from a relative rotation between input and output members of the start clutch, and varies the supply quantity of the lubrication oil supplied to the start clutch on the basis of a clutch heated condition obtained from a transmission torque of the start clutch and the relative rotation when the start clutch is put in the slipping connect state;
oil returning means for returning the lubricating oil from the start clutch to the automatic transmission; and
quantity varying means for varying the supply quantity of the lubricating oil supplied to the start clutch according to a slipping state of the start clutch.

8. The lubrication control apparatus as claimed in claim 7, wherein the transmission torque is obtained from a current quantity applied to the start clutch.

9. The lubrication control apparatus as claimed in claim 7, further comprising period setting mean for estimating an accumulated heat quantity of the start clutch on the basis of the transmission torque and the relative rotation, the period setting means varying a supply continuing period according to the estimated accumulated heat quantity, wherein a predetermined supply quantity of the lubricating oil, which supply quantity is greater than a minimum supply quantity determined on the basis of the estimated accumulated heat quantity, is supplied to the start clutch for the supply continuing period when the operating condition of the start clutch is changed from the slipping connect state to the complete engaged state.

10. A lubrication control apparatus for an electromagnetic start clutch disposed between an engine and an automatic transmission, the lubrication control apparatus comprising:
  a start clutch operating condition detector obtaining information of the relative rotation between input and output members of the start clutch, being indicative of an operating condition of the start clutch;
  an oil-quantity varying valve-unit varying a supply quantity of lubricating oil supplied to the start clutch; and
  a controller coupled to the start clutch operating condition detector and the lubricating oil quantity varying valve unit, the controller being arranged,
    to determine the operation condition of the start clutch on the basis of the information indicating the relative rotation between input and output members of the start clutch obtained by the start clutch operating condition detector,
    to determine a supply quantity of the lubricating oil supplied to the start clutch according to the operating condition of the start clutch, and
    to output a control signal to the oil-quantity varying valve-unit to control the supply quantity to the start clutch at the determined supply quantity.

11. The lubrication control apparatus as claimed in claim 10, wherein the start clutch operating condition detector comprises an engine rotational speed sensor for detecting a rotational speed of the engine as an input rotational speed of the start clutch and a primary pulley rotational speed sensor for detecting a rotational speed of a primary pulley of the automatic transmission as an output rotational speed of the start clutch.

12. A lubrication control apparatus for an electromagnetic start clutch disposed between an engine and an automatic transmission, the lubrication control apparatus comprising:
  a start clutch operating condition detector obtaining information indicative of an operating condition of the start clutch, comprising a detector for detecting a current quantity applied to an electromagnet of the start clutch;
  an oil-quantity varying valve-unit varying a supply quantity of lubricating oil supplied to the start clutch; and
  a controller coupled to the start clutch operating condition detector and the lubricating oil quantity varying valve unit, the controller being arranged,
    to determine the operation condition of the start clutch on the basis of the information obtained by the start clutch operating condition detector,
    to determine a supply quantity of the lubricating oil supplied to the start clutch according to the operating condition of the start clutch, and
    to output a control signal to the oil-quantity varying valve-unit to control the supply quantity to the start clutch at the determined supply quantity.

13. The lubrication control apparatus as claimed in claim 12, wherein the oil-quantity varying valve-unit comprises a lubrication control valve for controlling the supply quantity of the lubricating oil and a solenoid valve for controlling the lubrication control valve.

14. The lubrication control apparatus as claimed in claim 13, wherein the controller is further arranged to estimate an accumulated heat quantity of the start clutch on the basis of a transmission torque of the start clutch and a relative rotation between input and output member of the start clutch, to vary a supply continuing period according to the estimated accumulated heat quantity, and to control the solenoid valve so that a predetermined supply quantity of the lubricating oil, which supply quantity is greater than a minimum supply quantity determined on the basis of the estimated accumulated heat quantity, is supplied to the start clutch for the supply continuing period when the operating condition of the start clutch is changed from the slipping connect state to the complete engaged state.

15. A method for controlling a lubricating oil quantity supplied to a start clutch of an electromagnetic type, the start clutch being disposed between an engine and an automatic transmission, the method comprising the steps of:
  obtaining information of the relative rotation between input and output members of the start clutch, being indicative of an operating condition of the start clutch;
  determining an operation condition of the start clutch on the basis of the information indicative of the operating condition of the start clutch;
  determining a supply quantity of the lubricating oil supplied to the start clutch according to the operating condition of the electromagnetic clutch, and
  controlling the lubricating oil quantity supplied to the start clutch at the determined supply quantity.

* * * * *